(12) United States Patent
Watanabe et al.

(10) Patent No.: US 8,069,827 B2
(45) Date of Patent: Dec. 6, 2011

(54) VEHICLE COOLING CONTROLLER AND COOLING CONTROL METHOD

(75) Inventors: Yoshitaka Watanabe, Nagoya (JP); Koichi Mizutani, Toyota (JP); Naoki Toyofuku, Toyota (JP); Hiroki Morozumi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/682,184

(22) PCT Filed: Sep. 25, 2008

(86) PCT No.: PCT/JP2008/067264
§ 371 (c)(1),
(2), (4) Date: Apr. 8, 2010

(87) PCT Pub. No.: WO2009/066509
PCT Pub. Date: May 28, 2009

(65) Prior Publication Data
US 2010/0236502 A1 Sep. 23, 2010

(30) Foreign Application Priority Data
Nov. 21, 2007 (JP) .................................. 2007-301900

(51) Int. Cl.
*F01P 7/00* (2006.01)
(52) U.S. Cl. .................................. 123/41.02; 123/41.44
(58) Field of Classification Search .................. 123/431, 123/300, 406, 55, 446, 299, 510, 456, 467, 123/90.15–90.16, 41.02; 239/585.5, 533.1–533.9, 239/453, 87, 90; 92/52; 60/285, 620, 622, 60/712, 597, 517; *F01P 7/00*
See application file for complete search history.

(56) References Cited

U.S. PATENT DOCUMENTS 7,757,643 B2 * 7/2010 Harich et al. ............... 123/41.04

FOREIGN PATENT DOCUMENTS

| JP | A-10-231725 | 9/1998 |
|----|----|----|
| JP | A-2005-90236 | 4/2005 |
| JP | 2006097648 A * | 4/2006 |
| JP | A-2006-97648 | 4/2006 |
| JP | A-2006-161739 | 6/2006 |
| JP | A-2006-283711 | 10/2006 |

OTHER PUBLICATIONS

Jan. 20, 2009 Search Report issued in International Patent Application No. PCT/JP2008/067264 (with translation).
Jan. 20, 2009 Office Action issued in Japanese Patent Application No. 2007-301900 (with translation).
Apr. 14, 2009 Office Action issued in Japanese Patent Application No. 2007-301900 (with translation).
Jan. 20, 2009 Written Opinion issued in International Patent Application PCT/JP2008/067264 (with translation).

* cited by examiner

*Primary Examiner* — Michael Cuff
*Assistant Examiner* — Keith Coleman
(74) *Attorney, Agent, or Firm* — Oliff & Berridge, PLC (57) ABSTRACT

A drive component for driving an electric water pump for causing engine coolant to flow is mounted in an engine compartment. When the ignition is off and the temperature of a exhaust heat recovery device is above a temperature, an ECU estimates a peak temperature in the engine compartment after the stop of the engine. When the peak temperature is above a temperature, the ECU stops the engine and drives the electric water pump and an electric fan for cooling the drive component for driving the electric water pump.

12 Claims, 9 Drawing Sheets

VEHICLE COOLING CONTROLLER AND COOLING CONTROL METHOD

TECHNICAL FIELD

The present invention relates to control of cooling a vehicle provided with an electric water pump causing an engine coolant to flow and, more specifically, to vehicle cooling control in which the electric pump is driven after the engine is stopped when the vehicle is stopped.

BACKGROUND ART

A vehicle, in which cooling water is circulated in an engine using an electric water pump to keep the engine at a suitable temperature while the engine is driven to run the vehicle has been known. When the engine stops and the electric water pump is stopped simultaneously, it follows that the cooling water circulation stops while the engine is not sufficiently cooled yet. Therefore, the cooling water may possibly be overheated and boiled. If the electric water pump is operated after the engine stops in order to prevent boiling of cooling water, power consumption undesirably increases and load to the battery also increases. A solution to such a problem is disclosed, for example, in Japanese Patent Laying-Open No, 2005-90236 (Patent Document 1).

The cooling device for an internal combustion engine disclosed in Japanese patent Laying-Open No. 2005-90236 includes: an electric water pump for circulating cooling water, of which circulation flow rate is variable, in the internal combustion engine and in a heat exchanger; a detecting unit detecting information related to cooling water temperature; and a control unit controlling the flow rate of cooling water circulated by the electric water pump, based on the information related to cooling water temperature detected by the detecting unit, after the internal combustion engine is stopped.

By the cooling device for an internal combustion engine disclosed in Japanese Patent Laying-Open No. 2005-90236, the flow rate of cooling water circulated by the electric water pump is controlled even after the internal combustion engine is stopped. Therefore, boiling of cooling water after the stop of internal combustion engine can be prevented. Further, since the flow rate of cooling water circulated by the electric water pump is controlled based on the information related to cooling water temperature, the time and amount of operation of electric water pump can be minimized. As a result, the power consumed by electric water pump can be reduced, and the load to the battery can also be reduced.

Patent Document 1: Japanese Patent Laying-Open No. 2005-90236

DISCLOSURE OF THE INVENTION

Problems to be Solved by the Invention

It is often the case that the electric water pump and components for driving the electric water pump (such as a motor for driving the electric water pump, a motor driving circuit and a control circuit thereof) are provided in an engine compartment. When the vehicle stops and the engine stops, the wind that blows into the engine compartment while the vehicle is running stops, and residual heat in the engine stays inside the engine compartment. As a result, internal temperature of engine compartment increases to be higher than when the engine is stopped. If the increased internal temperature of engine compartment exceeds a heatproof temperature of components for driving the electric water pump, it would be impossible to operate the electric water pump. In the cooling device for an internal combustion engine disclosed in Japanese Patent Laying-Open No. 2005-90236, increase in internal temperature of the engine compartment after the engine stops is not at all considered.

The present invention was made to solve the above-described problems and its object is to provide, in a vehicle in which an electric water pump is driven after the engine is stopped, a cooling controller and a cooling control method, that can prevent overheating of components for driving the electric water pump installed in the engine compartment and thereby to prevent boiling of coolant after the engine is stopped, while reducing wasteful power consumption.

Means for Solving the Problems

The present invention provides a cooling controller for a vehicle including an engine in an engine compartment. The cooling controller includes an electric water pump causing flow of a coolant for the engine; a drive component for driving the electric water pump, mounted in the engine compartment; an electric fan for cooling the drive component; and a control unit controlling the electric water pump and the electric fan. The control unit drives the electric water pump after the engine is stopped, determines whether or not a value related to an internal temperature of the engine compartment after the engine is stopped exceeds a threshold value set based on a heatproof temperature of the drive component, and drives the fan when the electric water pump is driven after the engine is stopped and it is determined that the value related to the internal temperature exceeds the threshold value.

According to the present invention, in order to prevent boiling of coolant, the electric water pump is driven after the engine is stopped. At this time, it is possible that the internal temperature of engine compartment exceeds the heatproof temperature of components for driving the electric water pump. Therefore, if a value related to the internal temperature of engine compartment after the engine stops exceeds a threshold value set based on the heatproof temperature of components for driving the electric water jacket, an electric fan for cooling the drive components is driven. This prevents overheating of drive components to a temperature exceeding the heatproof temperature and, therefore, it becomes possible to continuously drive the electric water pump. Further, the electric fan is driven only when it is expected that the drive components would be overheated to exceed the heatproof temperature after the engine stops, so that wasteful power consumption can be prevented. As a result, it becomes possible to provide, in a vehicle in which an electric water pump is driven after the engine is stopped, a cooling controller and a cooling control method, that can prevent overheating of components for driving the electric water pump installed in the engine compartment and thereby to prevent boiling of coolant after the engine is stopped, while reducing wasteful power consumption.

Preferably, the control unit estimates, before the engine is stopped, as the value related to the internal temperature, a peak value of the internal temperature after the engine is stopped, and when the electric water pump is driven after the engine is stopped and it is determined that the peak value will exceed the threshold value, drives the electric fan for a predetermined time period from when the engine is stopped.

According to the present invention, the peak value of internal temperature after the engine stops is estimated before the engine stops. If it is determined that the peak value will exceed the threshold value, the electric fan is driven from when the engine is stopped until after the lapse of a predetermined time period. Therefore, overheating of components for driving the electric water pump to be higher than the heatproof temperature can be prevented.

More preferably, the predetermined time period is set based on the peak value of the internal temperature.

According to the present invention, the predetermined time period (the time for driving the electric fan after the engine stops) is set based on the peak value of internal temperature. Therefore, if the peak value of internal temperature is high, the driving time may be made longer to prevent overheating of drive components, and if the peak value is low, the driving time may be made shorter to reduce power consumption to prevent overheating of the drive components.

More preferably, the control unit estimates, as the value related to the internal temperature, a temporal transition value of the internal temperature after the engine is stopped, and when the electric water pump is driven after the engine is stopped and it is determined that the temporal transition value will exceed the threshold value, drives the electric fan from a timing in accordance with a timing when the temporal transition value exceeds the threshold value.

According to the present invention, the temporal transition of internal temperature after the engine stops is estimated. If it is determined that the temporal transition value will exceed the threshold value, the electric fan is driven at a timing corresponding to the timing when the temporal transition value is about to exceed the threshold value. By such an approach, it becomes possible to drive the electric fan at just the time point when the components for driving the electric water pump are overheated to exceed the heatproof temperature. Therefore, the power consumption can be reduced than when the electric fan is driven after the engine is stopped.

More preferably, the control unit estimates the value related to the internal temperature, based on temperature of the coolant before the engine is stopped and on load history on the engine before the engine is stopped.

According to the present invention, the quantity of heat generated by the engine is correlated to the coolant temperature and to engine load history. Therefore, based on the coolant temperature before the engine stops and the engine load history before the engine stops, the value related to the internal temperature is estimated. By such an approach, it becomes possible to estimate with high accuracy the peak temperature of the internal temperature and the time until the peak temperature is reached, in the engine compartment after the engine stops, in consideration of the quantity of heat generated by the engine and the elapsed time after heat generation. Therefore, it is possible to drive the electric fan, without providing a temperature sensor dedicated for detecting the internal temperature of the engine compartment.

More preferably, the control unit detects, as the value related to the internal temperature, the internal temperature after the engine is stopped, and when the electric water pump is driven after the engine is stopped and the detected internal temperature exceeds the threshold value, drives the electric fan.

According to the present invention, when the internal temperature of engine compartment after the engine stops is detected and the detected internal temperature exceeds the threshold value, the electric fan is driven. Therefore, it is possible to drive the electric fan depending on an appropriate determination as to whether the drive components of electric water pump will be overheated to exceed the heatproof temperature, based on the actually detected internal temperature. Therefore, wasteful power consumption can be reduced than when the internal temperature is estimated.

More preferably, the vehicle further includes a heat exchanger transmitting exhaust heat of the engine to the coolant, and a power storage device storing power for driving the electric water pump and the electric fan. The control unit drives the electric water pump based on at least one of temperature of the coolant, temperature of the heat exchanger and state of charge of the power storage device.

According to the present invention, the electric water pump is driven after the engine stops, based on at least one of the temperature of coolant, the temperature of heat exchanger and the state of charge of the power storage device. By such an approach, it is possible to drive the electric water pump in accordance with the temperature of engine coolant and the temperature of heat exchanger, and thereby to prevent boiling of coolant in the engine and the heat exchanger. Further, it is possible to stop driving of electric water pump or to adjust the time and amount of driving electric water pump, in consideration of state of charge of the power storage device, so that it is possible to restart the engine and to run the vehicle.

More preferably, the control unit drives the electric water pump when the temperature of the heat exchanger is higher than a predetermined temperature, the temperature of the coolant is lower than a predetermined temperature and time period from when the engine is stopped until it is restarted is expected to be short.

According to the present invention, even if the temperature of heat exchanger is high because of exhaust heat, the engine coolant temperature may be low and the engine is not well warmed. In such a situation, if it is estimated that the time period from engine stop to engine restart is short, the electric water pump is driven. Thus, the coolant that absorbed the heat of heat exchanger while the engine is stopped circulates through the engine. As a result, at the time of engine restart, the engine has been well warmed and hence, good starting characteristic of the engine is realized.

More preferably, the vehicle further includes a first power storage device storing power for driving the electric water pump and the electric fan, a second power storage device different from the first power storage device, and a voltage converter provided between the first power storage device and the second power storage device. The control unit controls the voltage converter such that the first power storage device is charged with the power from the second power storage device, when the electric water pump is driven after the engine is stopped and a prescribed condition is satisfied.

More preferably, the prescribed condition is that a value indicating state of charge of the first power storage device is smaller than a prescribed value.

DESCRIPTION OF THE REFERENCE SIGNS 10, 20 hybrid vehicle, 12 ignition switch, 14 engine compartment, 100 engine, 110 exhaust pipe, 120 exhaust heat recovery device, 122, 124, 132, 134 cooling water pipe, 130 radiator, 140 electric fan, 150 electric water pump, 151, 152, 160 engine speed sensor, 162 engine water temperature sensor, 170 temperature sensor, 180 temperature sensor, 300 motor generator, 310 running battery, 312, 362 monitoring unit, 320 boosting converter, 330 inverter, 350 DC/DC converter, 360 auxiliary battery, 370 SMR, 400 ECU, 410 system control unit, 420 temperature estimating unit, 430 W/P control unit, 440 fan control unit.

BEST MODES FOR CARRYING OUT THE INVENTION

In the following, embodiments of the present invention will be described with reference to the figures. In the following description, the same components are denoted by the same reference characters. Their names and functions are also the same. Therefore, detailed description thereof will not be repeated.

First Embodiment

Figure 1:
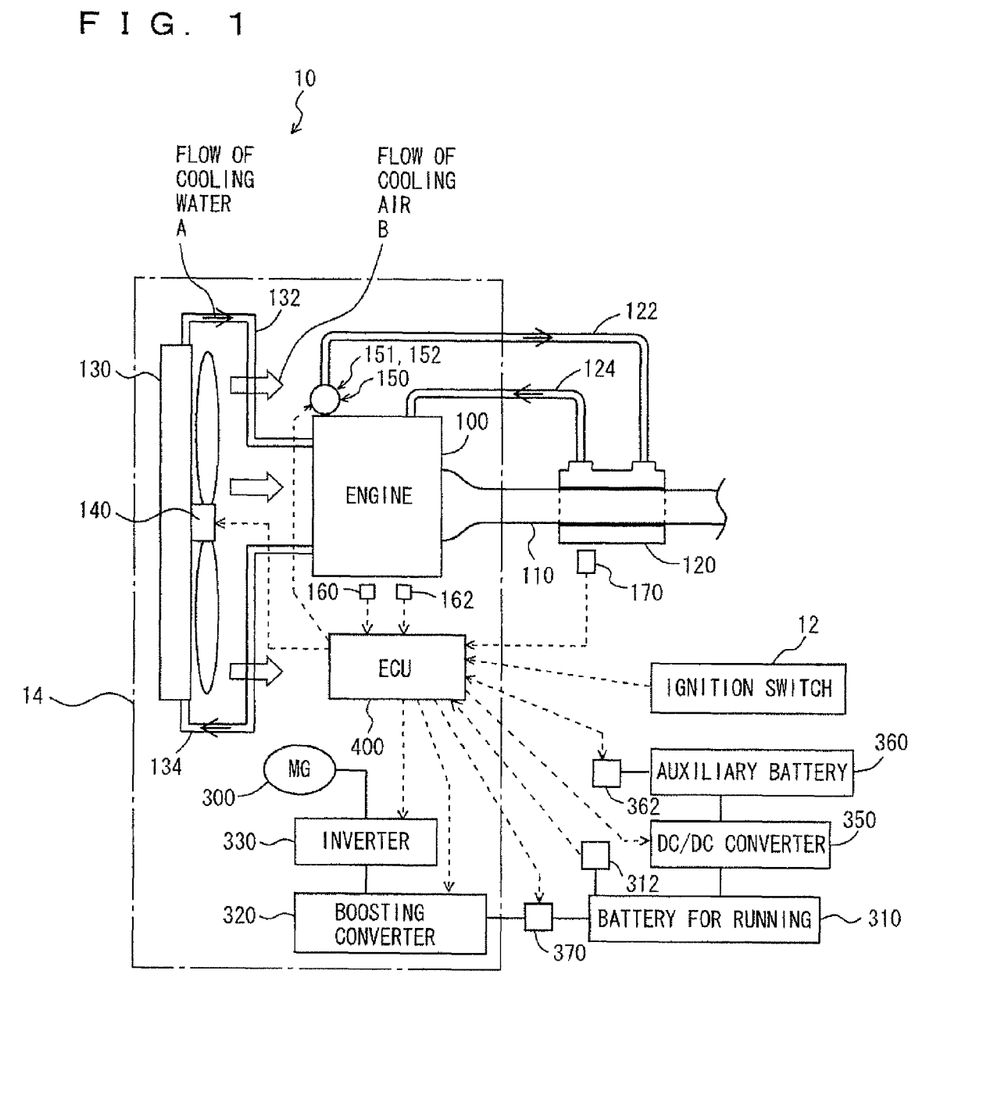
[FIG. 1] A diagram showing a configuration of a vehicle on which the cooling controller in accordance with a first embodiment of the present invention is installed.

Referring to FIG. 1, a hybrid vehicle 10 provided with the cooling controller in accordance with the present embodiment will be described. The vehicle to which the cooling controller of the present invention is applicable is not limited to the hybrid vehicle shown in FIG. 1, and it may be a different type hybrid vehicle or may be a common engine vehicle.

Hybrid vehicle 10 includes an engine 100, a motor generator 300, a battery 310 for running, storing electric power for driving motor generator 300, an inverter performing current control by conversion between DC of battery 310 for running and AC of motor generator 300, a boosting converter 320 for boosting electric power when electric power is supplied from battery 310 for running to motor generator 300, an auxiliary battery 360, a DC/DC converter 350, an SMR (System Main Relay) 370 provided between battery 310 for running and boosting converter 320, and an ECU 400 for overall control of the hybrid system to realize the most efficient operation of hybrid vehicle 10.

Engine 100 is mounted inside an engine compartment 14. In engine compartment 14, a radiator 130, motor generator 300, inverter 330, boosting converter 320 and ECU 400 are mounted, in addition to engine 100. In the present embodiment, an example in which ECU 400 is mounted as one component mounted inside engine compartment 14 will be described. The ECU, however, may be divided into a plurality of ECUs in accordance with functions, and an ECU controlling engine 100 and its peripheral components (for example, an electric water pump 150 and an electric fan 140, which will be described later) may be provided in engine compartment 14 and other ECUs may be provided outside engine compartment 14.

Inside engine 100, a water jacket (not shown) is formed, through which cooling water flows. The water jacket is communicated with radiator 130 through cooling water pipes 132 and 134.

To an exhaust pipe 110 of engine 100, a exhaust heat recovery device 120 is connected. Exhaust heat recovery device 120 is communicated with the water jacket of engine 100 through cooling water pipes 122 and 124. The cooling water inside exhaust heat recovery device 120 absorbs the heat of exhaust gas in exhaust pipe 110, and circulated to water jacket of engine 100. Thus, the heat of exhaust gas is effectively utilized for heating engine 100.

An electric water pump (W/P) 150 causing the flow of cooling water is provided close to a connection between cooling water pipe 122 and engine 100 (that is, in engine compartment 14). In electric water pump 150, a driving motor 151 and a driving circuit 152 for driving motor 151 are provided. Electric water pump 150 is driven by electric power from auxiliary battery 360, and controlled by a control signal from ECU 400. As electric water pump 150 is driven, the cooling water circulates through radiator 130, engine 100 and exhaust heat recovery device 120 (see an arrow A of FIG. 1).

On the side of engine 100 of radiator 130, an electric fan 140 is provided. Electric fan 140 causes air outside of the vehicle to flow into engine compartment 140 as cooling air, and thereby cools radiator 130. Further, electric fan 140 also generates cooling air in engine 100 (see an arrow B of FIG. 1), to cool components in engine compartment 14 including engine 100, electric water pump 150 and ECU 400. Electric fan 140 may be an electric fan exclusively used for cooling electric water pump 150 and ECU 400.

Battery 310 for running supplies electric power to boosting converter 320 and DC/DC converter 350, in accordance with a control signal from ECU 400. Auxiliary battery 360 supplies power to various electric devices (such as electric water pump 150, electric fan 140 and ECU 400) that operate with low voltage power, in accordance with a control signal from ECU 400. DC/DC converter 350 converts a high voltage of battery 310 for running to a low voltage for auxiliary battery 360 and supplies it to auxiliary battery 360, in accordance with a control signal from ECU 400.

To ECU 400, signals from an ignition switch 12, an engine speed sensor 160, an engine water temperature sensor 162, a temperature sensor 170 and monitoring units 312 and 362 are input.

Ignition switch 12 has its on/off switched by a driver of hybrid vehicle 10. When ignition switch 12 is switched from off to on, electric power from auxiliary battery 360 is supplied to various electric devices including ECU 400, and an IG on signal is transmitted from ignition switch 12 to ECU 400. ECU 400 transmits the IG on signal to DC/DC converter 350, so as to start the operation of DC/DC converter 350. Further, receiving the IG on signal, ECU 400 activates the hybrid system.

On the other hand, when ignition switch 12 is switched from on to off while the vehicle is in a stopped state, an IG off signal is transmitted from ignition switch 12 to ECU 400. ECU 400 transmits the IG off signal to DC/DC converter 350, to stop the operation of DC/DC converter 350. Further, receiving the IG off signal, ECU 400 stops engine 100, and shuts off power supply from auxiliary battery 360 to each of the electric devices, so that the hybrid system is stopped.

Engine speed sensor 160 detects the number of rotations (engine speed) NE of a crankshaft as an output shaft of engine 100, and transmits a signal indicating the result of detection to ECU 400.

Engine water temperature sensor 162 detects the temperature (engine water temperature) TE of cooling water flowing through the water jacket of engine 100, and transmits a signal indicating the result of detection to ECU 400.

Temperature sensor 170 detects the temperature (exhaust heat recovery device temperature) TG of exhaust heat recovery device 120, and transmits a signal indicating the result of detection to ECU 400. It is noted that the temperature of cooling water flowing inside the exhaust heat recovery device 120 may be detected as exhaust heat recovery device temperature TG.

Monitoring unit 312 is connected to battery 310 for running, calculates a value (SOC) representing state of charge of battery 310 for running based on information from a voltage sensor, a current sensor and a temperature sensor (all not shown) provided on battery 310 for running, and transmits a signal indicating the result of calculation to ECU 400. ECU 400 controls (connects/disconnects) SMR 370 based on the information received from monitoring unit 312.

Monitoring unit 362 is connected to auxiliary battery 360, calculates a value (SOC) representing state of charge of auxiliary battery 360 based on information from a voltage sensor, a current sensor and a temperature sensor provided on auxiliary battery 360, and transmits a signal indicating the result of calculation to ECU 400. Further, monitoring unit 362 controls output power of auxiliary battery 360 based on a signal from ECU 400.

ECU 400 controls devices and equipment to realize desired running state of the vehicle, based on the signals transmitted from engine speed sensor 160, engine water temperature sensor 160, monitoring units 312 and 362 and so on, as well as a map and a program stored in an ROM (Read Only Memory).

Figure 2:
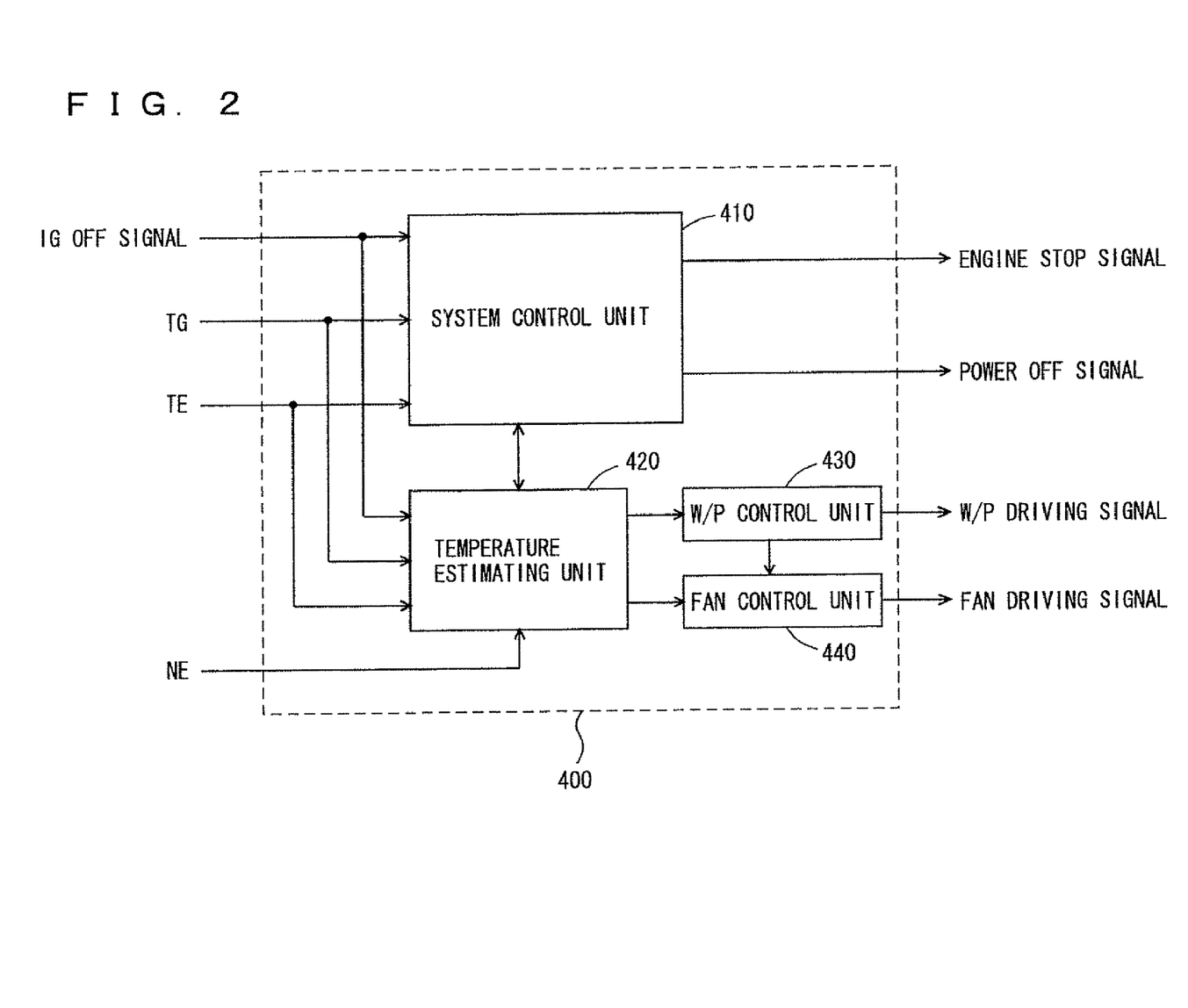
[FIG. 2] A functional block diagram of the cooling controller in accordance with the first embodiment of the present invention.

Referring to FIG. 2, a functional block diagram of the cooling controller in accordance with the present embodiment will be described. As shown in FIG. 2, the cooling controller includes a system control unit 410, a temperature estimating unit 420, a W/P control unit 430 and a fan control unit 440.

Receiving the IG off signal from ignition switch 12, system control unit 410 transmits an engine stop signal to engine 100 and transmits a power off signal to SMR 370 and monitoring unit 362 to shut-off power supply from battery 310 for running and from auxiliary battery 360, based on engine water temperature TE, exhaust heat recovery device temperature TG and a signal from temperature estimating unit 420. Further, system control unit 410 also transmits these signals to temperature estimating unit 420.

Temperature estimating unit 420 estimates, based on the IG off signal, engine water temperature TE, exhaust heat recovery device temperature TG, engine speed NE and the signal from system control unit 410, the internal temperature of engine compartment 14 after the engine is stopped, and transmits a signal indicating the result of estimation to W/P control unit 430 and fan control unit 440. The estimated internal temperature includes the temperature at the time point of engine stop and the temperature after the engine stop.

W/P control unit 430 transmits a W/P driving signal to electric water pump 150 and to fan control unit 440, based on the internal temperature from temperature estimating unit 420.

Fan control unit 440 transmits a fan driving signal to electric fan 140, based on the internal temperature from temperature estimating unit 420 and on the signal from W/P control unit 430.

The controller in accordance with the present embodiment having such functional blocks may be implemented by hardware mainly formed of digital or analog circuit structures or by software mainly formed of a CPU (Central Processing Unit) and a memory included in ECU 400 and a program read from the memory and executed by the CPU. Generally, hardware implementation is said to be advantageous from the viewpoint of operation speed, and software implementation is said to be advantageous from the viewpoint of design change. In the following, the controller implemented by software will be described.

Figure 3:
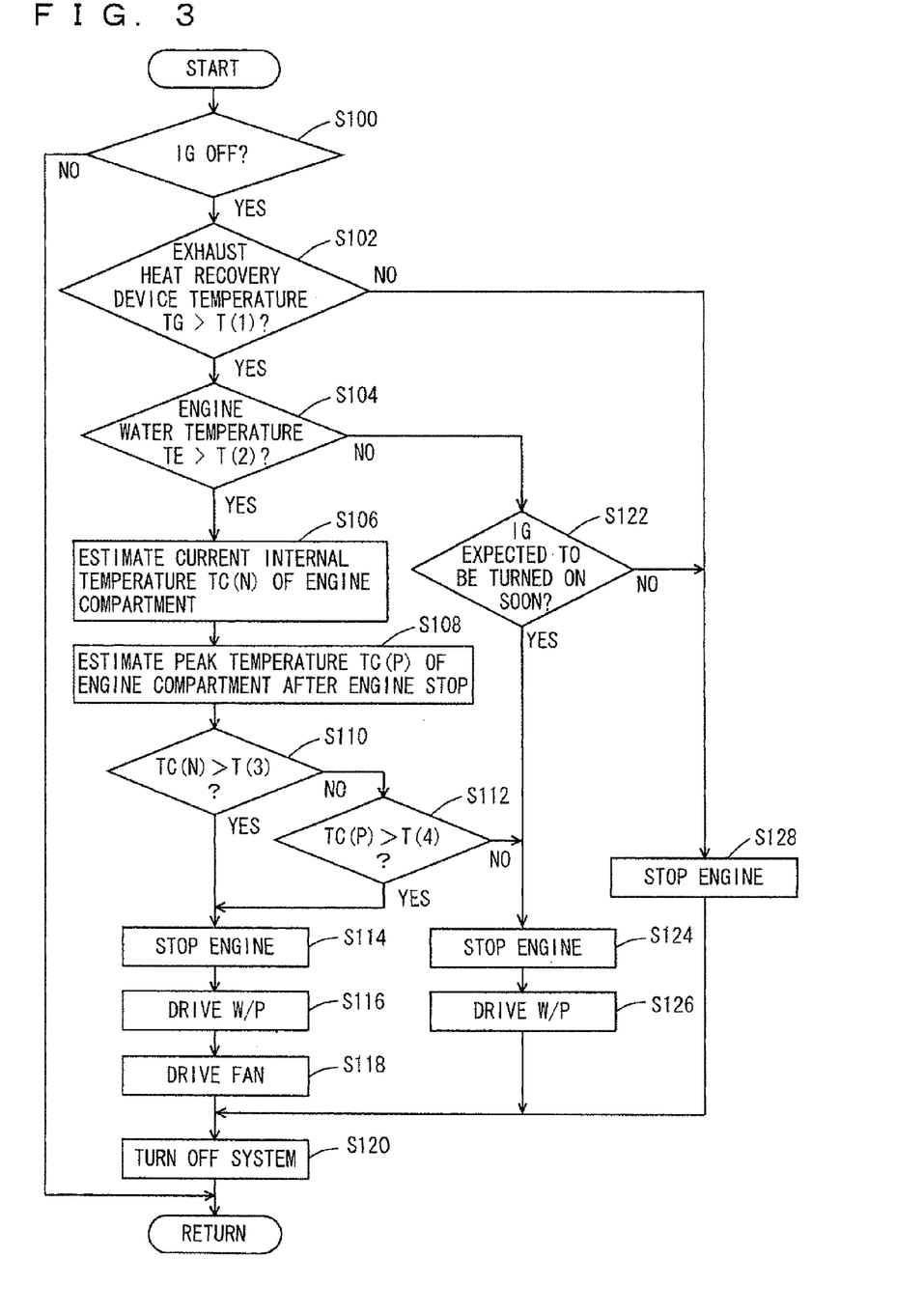
[FIG. 3] A flowchart representing a control structure of an ECU forming the cooling controller in accordance with the first embodiment of the present invention.

Referring to FIG. 3, the control structure of a program executed by ECU 400 as a cooling controller in accordance with the present embodiment will be described. The program is executed repeatedly in a predetermined cycle time.

At step (hereinafter the step will be simply denoted by S) 100, ECU 400 determines, based on the IG signal from ignition switch 12, whether or not ignition switch 12 has been switched to off by the driver. If it is determined to be turned off (YES at S100), the process proceeds to S102. Otherwise (NO at S100), the process ends.

At S102, ECU 400 determines whether or not exhaust heat recovery device temperature TG has exceeded a predetermined temperature T(1). The predetermined temperature T(1) is a threshold value for determining whether there is a possibility that the cooling water in exhaust heat recovery device 120 is boiled after the engine is stopped, and it is set to a temperature close to but lower than the boiling point of cooling water. If it is higher than the predetermined temperature T(1) (YES at S102), the process proceeds to S104. Otherwise (NO at S102), the process proceeds to S128.

At S104, ECU 400 determines whether engine water temperature TE has exceeded a predetermined temperature T(2). The predetermined temperature T(2) is a threshold value for determining whether or not warming of engine 100 is necessary. If it is higher than the predetermined temperature T(2) (YES at S104), the process proceeds to S106. Otherwise (NO at S104), the process proceeds to S122.

At S106, ECU 400 estimates the current internal temperature TC(N) of engine compartment 14. By way of example, ECU 400 estimates the current internal temperature TC(N) using, as parameters, engine water temperature TE that is correlated to the quantity of heat generated by engine 100, accumulated value of engine load (for example, engine speed NE) up to the present time, and vehicle speed history that is correlated to cooling by the air generated when the vehicle runs. It is noted that the method of estimating current internal temperature TC(N) is not limited to the above.

At S108, ECU 400 estimates the peak temperature TC(P) in engine compartment 14 after the engine stops. By way of example, ECU 400 estimates the peak temperature TC(P) using, as parameters, the engine water temperature TE, engine load accumulated value and vehicle speed history as described above. It is noted that the method of estimating the peak temperature TC(P) is not limited to the above.

At S110, ECU 400 determines whether or not the current internal temperature TC(N) has exceeded a predetermined temperature T(3). The predetermined temperature T(3) is set based on the heatproof temperature of components for driving electric water pump 150 in engine compartment 14 (including driving motor 151 inside electric water pump 150, driving circuit 152 for driving the motor 151 and ECU 400), and set to a value not higher than the heatproof temperature. If it is determined to be higher than the predetermined temperature T(3) (YES at S110), the process proceeds to S114. Otherwise (NO at S110), the process proceeds to S112.

At S112, ECU 400 determines whether or not the peak temperature TC(P) has exceeded a predetermined temperature T(4). The predetermined temperature T(4) is determined based on the heatproof temperature of components for driving electric water pump 150 in engine compartment 14, and set to a temperature not higher than the heatproof temperature. The predetermined temperature T(4) may be the same as the predetermined temperature T(3) described above. If it is higher than the predetermined temperature T(4) (YES at S112), the process proceeds to S114. Otherwise (NO at step S112), the process proceeds to S124.

At S114, ECU 400 transmits the engine stop signal to engine 100, to stop engine 100.

At S116, ECU 400 transmits a W/P driving signal to electric water pump 150, and thereby drives electric water pump 150 for a predetermined time period. The predetermined time period (driving time of electric water pump 150) may be changed in accordance with the current internal temperature TC(N) or the peak temperature TC(P).

At S118, ECU 400 transmits a fan driving signal to electric fan 140, and thereby drives electric fan 140 for a predetermined time period. The predetermined time period (driving time of electric fan 140) may be changed in accordance with the current internal temperature TC(N) or the peak temperature TC(P). It is noted that the driving time of electric fan 140 may or may not be the same as the driving time of electric water pump 150.

At S120, ECU 400 transmits a power off signal to monitoring units 312 and 362, to shut-off power supply from auxiliary battery 360 to each of the electric devices, and thereby stops the hybrid system.

At S122, ECU 400 determines whether or not the driver is expected to soon turn on the ignition. By way of example, ECU 400 learns patterns in which the ignition is turned on shortly after it is turned off, using travel distance of one trip, system activation duration and system stop time as parameters, and if the present situation matches with any of the learned patterns, it expects that the driver will soon turn on the ignition. If it is expected that the ignition will be soon turned on (YES at S122), the process proceeds to S124. Otherwise (NO at S122), the process proceeds to S128.

At S124, ECU 400 transmits an engine stop signal to engine 100, and thereby stops engine 100. At S126, ECU 400 transmits the W/P driving signal to electric water pump 150, and drives electric water pump 150 for a predetermined time period. The predetermined time period (driving time of electric water pump 150) may be changed in accordance with engine water temperature TE. Further, the driving time of electric water pump at this step may be or may not be the same as the driving time of electric water pump at step S116.

At S128, ECU 400 transmits the engine stop signal to engine 100 and thereby stops engine 100.

The operation of electric water pump 150, the operation of electric fan 140 and the temperature in engine compartment 14, which are controlled by ECU 400 as the cooling controller in accordance with the present embodiment, based on the structure and flowchart as above, will be described.

Assume that at the time point t(1) while the vehicle is in the stopped state, the driver turns the ignition off (YES at S100). Here, if exhaust heat recovery device temperature TG is higher than T(1) (YES at S102), meaning that the coolant in exhaust heat recovery device 120 will possibly boil, and if engine temperature TE is higher than T(2) (YES at S104), the current inner temperature TC(N) of engine compartment 14 is estimated (S106).

Figure 4:
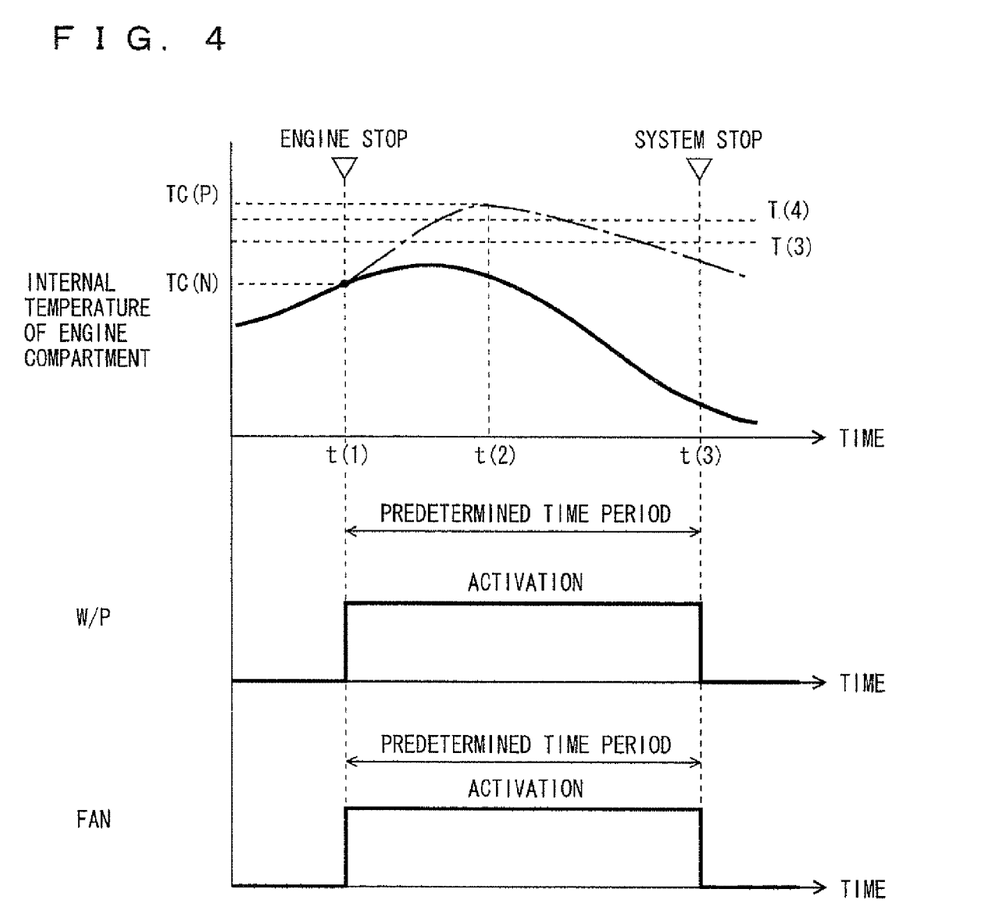
[FIG. 4] A timing chart of the internal temperature of the engine compartment.

In FIG. 4, chain-dotted line represents temporal transition of internal temperature in engine compartment 14, when electric fan 140 is not driven after the engine stops. As is apparent from the chain-dotted line of FIG. 4, the internal temperature of engine compartment 14 increases to the peak temperature at a time point t(2) later than when the engine is stopped, since cooling effect by the air flow caused when the vehicle is running is not expected as the vehicle is stopped and the residual heat of engine 100 stays inside engine compartment 14.

Therefore, not only the current internal temperature TC(N) but also the peak temperature TC(P) in engine compartment 14 after the engine stops are estimated (S108).

As shown in FIG. 4, even if the current internal temperature (that is, the temperature at the time point when the engine stops) TC(N) is lower than the predetermined temperature T(3) (NO at S110), after the engine is stopped (S114), electric water pump 150 is driven for a prescribed time period (S116) and electric fan 140 is driven for a prescribed time period (S118), if the peak temperature TC(P) is higher than the predetermined temperature T(4) (YES at S112).

Since electric fan 140 is driven, inside of engine compartment 14 is cooled, and the actual peak temperature in engine compartment 14 becomes lower than T(3) or T(4), as shown by the solid line in FIG. 4. Therefore, it becomes possible to prevent the components for driving electric water pump 150 (motor 151 for driving electric water pump 150, driving circuit 152 for the motor 151, ECU 400 and the like) in engine compartment 14 from being heated to exceed the heatproof temperature. Thus, electric water pump 150 can continuously be driven, and boiling of cooling water in exhaust heat recovery device 120 can appropriately be avoided.

Further, electric fan 140 is driven only when the estimated peak temperature TC(P) exceeds the temperature set based on the heatproof temperature of components for driving electric water pump 150. This minimizes driving of electric fan 140 and, therefore, wasteful power consumption can be reduced.

Further, since the current internal temperature TC(N) and peak temperature TC(P) are estimated using engine water temperature TE and the like as parameters, it is unnecessary to provide a temperature sensor exclusively for detecting the internal temperature of engine compartment 14.

Further, when the peak temperature TC(P) is estimated, in addition to engine water temperature TE, the engine load accumulated value correlated to the quantity of heat generated by the engine, vehicle speed history correlated to cooling by the air generated when the vehicle runs and so on are used as parameters. Therefore, the peak temperature TC(P) can be estimated with high accuracy, in consideration of the quantity of heat generated by engine 100, time elapsed from heat generation and cooling by the air generated when the vehicle runs.

Further, as described above, the time for driving electric fan 140 may be changed in accordance with the current internal temperature TC(N) or the peak temperature TC(P). By way of example, if the peak temperature TC(P) is high, the driving time is made longer and if the peak temperature TC(P) is low, the driving time is made shorter. By such an approach, it becomes possible to appropriately reduce power consumed by the driving of electric fan 140, while overheating of components for driving electric water pump 150 can be prevented appropriately.

If the exhaust heat recovery device temperature TG is higher than T(1) (YES at S102), engine water temperature TE is lower than T(2) (NO at S104) meaning that warming of engine 100 is necessary, and it is expected that the driver will soon turn on the ignition (YES at S122), only the electric water pump is driven (S126) after the engine stops (S124). As a result, heat in exhaust heat recovery device 120 is transmitted to the coolant while the engine is stopped and the coolant circulates through engine 100, whereby engine 100 is warmed. Therefore, when the engine is restarted, engine 100 will have been already warmed. Thus, good starting characteristic and improved fuel consumption efficiency of the engine can be attained.

As described above, by the cooling controller in accordance with the present embodiment, the peak temperature in the engine compartment after the engine stops is estimated. If it is determined that the estimated peak temperature exceeds the heatproof temperature of components for driving the electric water pump in the engine compartment, the electric fan for cooling the drive components is driven. Therefore, overheating of components for driving the electric water pump is prevented and the electric water pump can continuously be driven, whereby boiling of coolant after the engine is stopped can appropriately be prevented.

<Modification (Version 1) of the First Embodiment>

The control structure of the program executed by ECU 400 in accordance with the first embodiment described above may be changed from the structure shown by the flowchart of FIG. 3 to the structure shown by the flowchart of FIG. 5, which will be described below.

Figure 5:
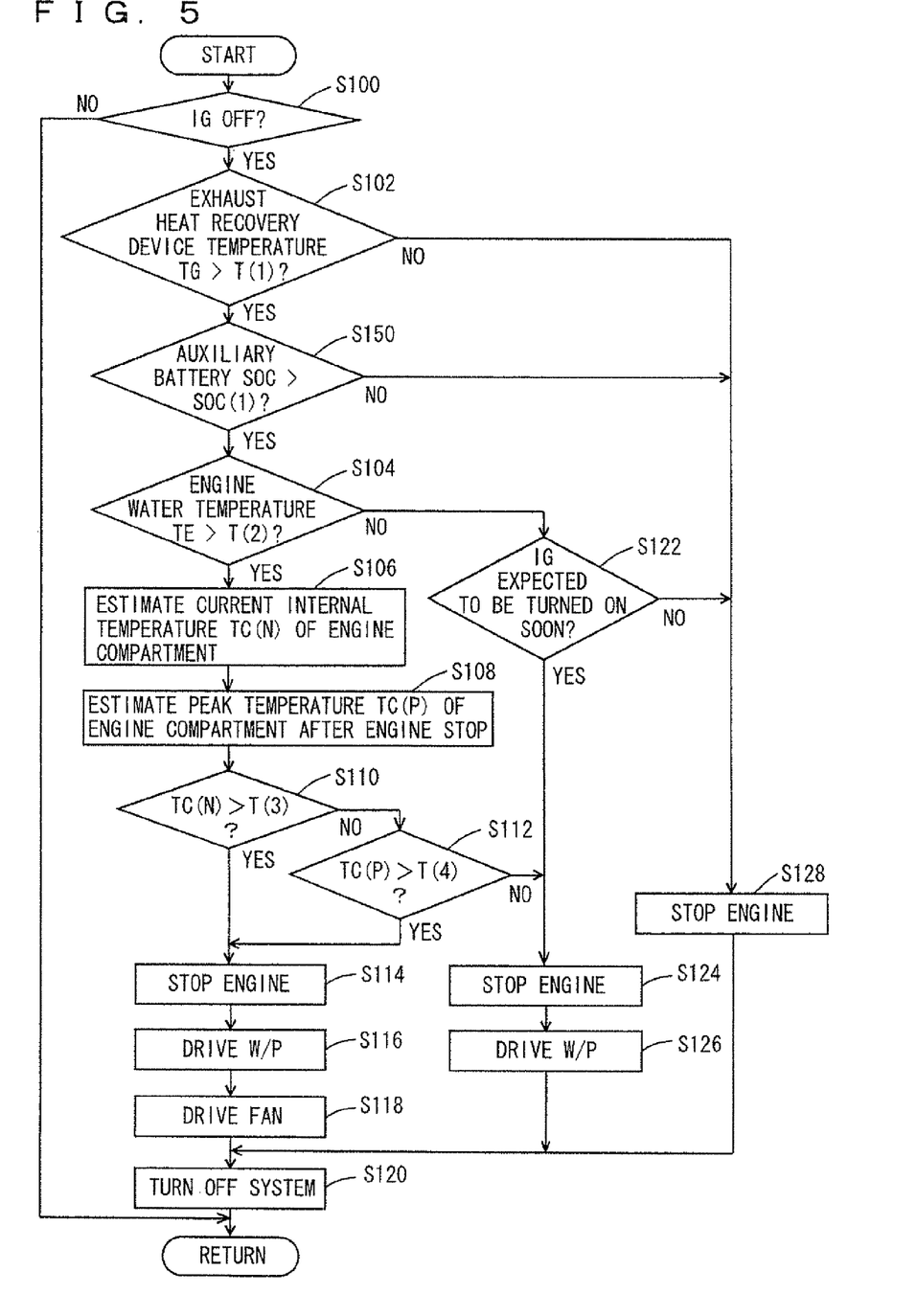
[FIG. 5] A flowchart representing a control structure of an ECU forming the cooling controller in accordance with a modification (Version 1) of the first embodiment of the present invention.

Referring to FIG. 5, the control structure of the program executed by ECU 400 as the cooling controller in accordance with the present modification will be described. In the flowchart shown in FIG. 5, the same processes as those of the flowchart shown in FIG. 3 are denoted by the same step numbers. The process contents are also the same. Therefore, detailed description thereof will not be repeated.

At S150, ECU 400 determines whether or not SOC of auxiliary battery 360 has exceeded a predetermined value SOC(1). The predetermined value SOC(1) is set to such a value that auxiliary battery 360 will not enter an over-discharged state even when electric water pump 150 and electric fan 140 are driven after the engine is stopped. If it is higher than the predetermined value SOC(1) (YES at S150), the process proceeds to S104. Otherwise (NO at S150), the process proceeds to S128.

By such an approach, if SOC of auxiliary battery 360 is higher than SOC(1) (YES at S150) meaning that sufficient power is stored in auxiliary battery 360, it is possible to drive electric water pump 150 and electric fan 140 as in the first embodiment, to prevent overheating of components for driving the electric water pump. If SOC of auxiliary battery 360 is lower than SOC(1) (NO at S150), prevention of over-discharge of auxiliary battery 360 is of higher priority and, therefore, after the engine stops (S128), electric water pump 150 and electric fan 140 are not driven. Therefore, when the driver again turns on ignition switch 12, the hybrid system can reliably be activated and hence, inconvenience to the user can be prevented.

In order to reliably reactivate the hybrid system, not only the driving/stopping of electric water pump 150 and electric fan 140 but also the time of driving and the number of driving may be adjusted delicately in accordance with SOC of auxiliary battery 360, to reduce power consumption, <Modification (Version 2) of the First Embodiment>

The control structure of the program executed by ECU 400 in accordance with the first embodiment described above may be changed from the structure shown by the flowchart of FIG. 3 to the structure shown by the flowchart of FIG. 6, which will be described below.

Figure 6:
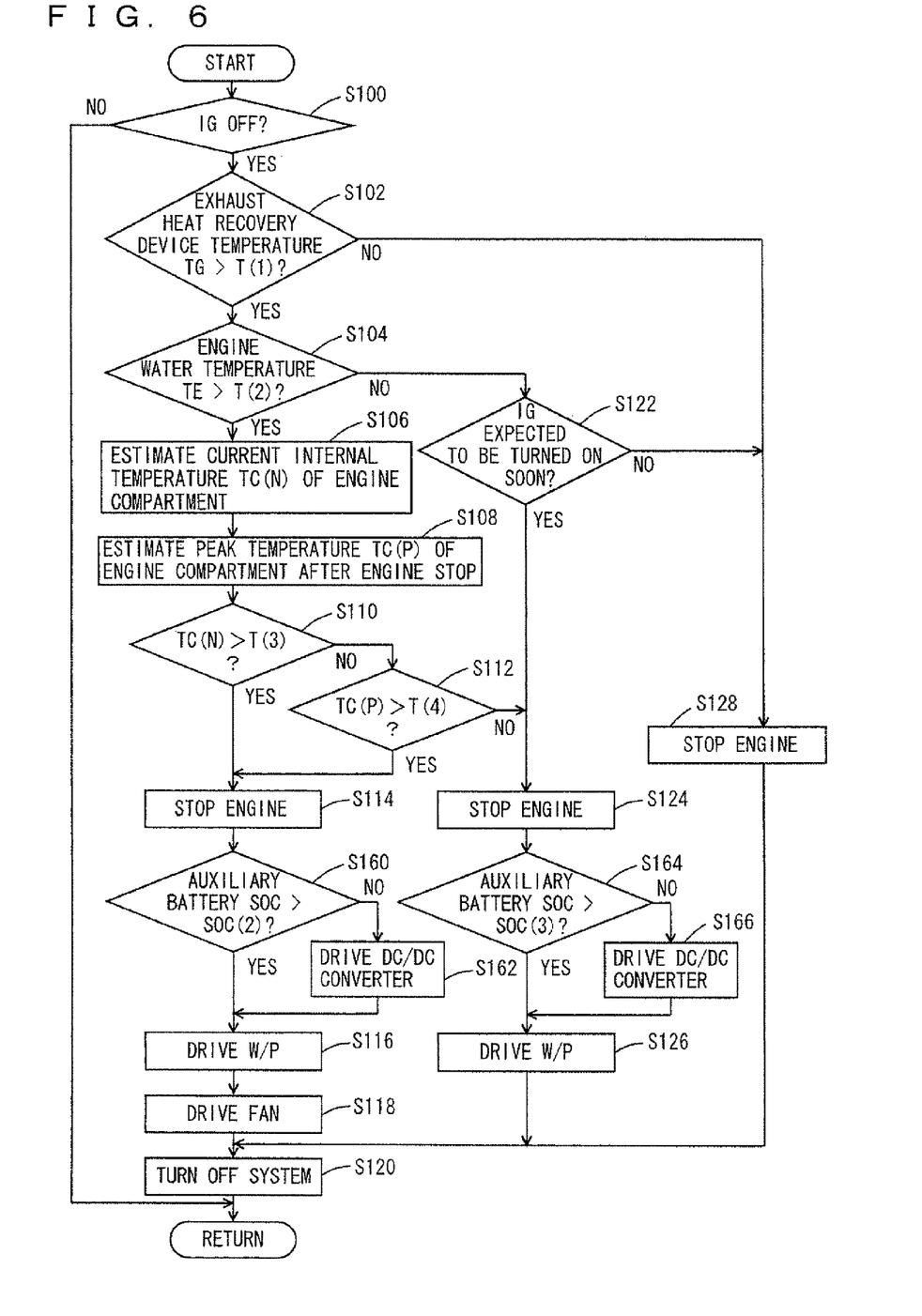
[FIG. 6] A flowchart representing a control structure of an ECU forming the cooling controller in accordance with a modification (Version 2) of the first embodiment of the present invention.

Referring to FIG. 6, the control structure of the program executed by ECU 400 as the cooling controller in accordance with the present modification will be described. In the flowchart shown in FIG. 6, the same processes as those of the flowchart shown in FIG. 3 are denoted by the same step numbers. The process contents are also the same. Therefore, detailed description thereof will not be repeated.

At S160, ECU 400 determines whether or not SOC of auxiliary battery 360 has exceeded a predetermined value SOC(2). The predetermined value SOC(2) is set to such a value that auxiliary battery 360 will not enter an over-discharged state even when electric water pump 150 and electric fan 140 are driven after the engine is stopped. If it is higher than the predetermined value SOC(2) (YES at S160), the process proceeds to S116. Otherwise (NO at S160), the process proceeds to S162.

At S162, ECU 400 drives DC/DC converter 350 to lower the voltage of power from battery 310 for running, and applies the resulting power to auxiliary battery 360.

At S164, ECU 400 determines whether or not SOC of auxiliary battery 360 has exceeded a predetermined value SOC(3). The predetermined value SOC(3) is set to such a value that auxiliary battery 360 will not enter an over-discharged state even when electric water pump 150 and electric fan 140 are driven after the engine is stopped. If it is higher than the predetermined value SOC(3) (YES at S164), the process proceeds to S126. Otherwise (NO at S164), the process proceeds to S166.

At S166, ECU 400 drives DC/DC converter 350 to lower the voltage of power from battery 310 for running, and applies the resulting power to auxiliary battery 360.

By this approach, if SOC of auxiliary battery 360 is lower than SOC(2) (NO at S160) or lower than SOC(3) (NO at S164), it is possible to drive DC/DC converter 350 to charge auxiliary battery 360. Therefore, even when electric water pump 150 and electric fan 140 are driven, auxiliary battery 360 will not be over-discharged. As a result, it become possible to appropriately prevent boiling of cooling water in exhaust heat recovery device 120 by continuously driving the electric water pump, and to reliably reactivate the hybrid system when the driver again turns on ignition switch 12.

<Modification (Version 3) of the First Embodiment>

The control structure of the program executed by ECU 400 in accordance with the first embodiment described above may be changed from the structure shown by the flowchart of FIG. 3 to the structure shown by the flowchart of FIG. 7, which will be described below.

Figure 7:
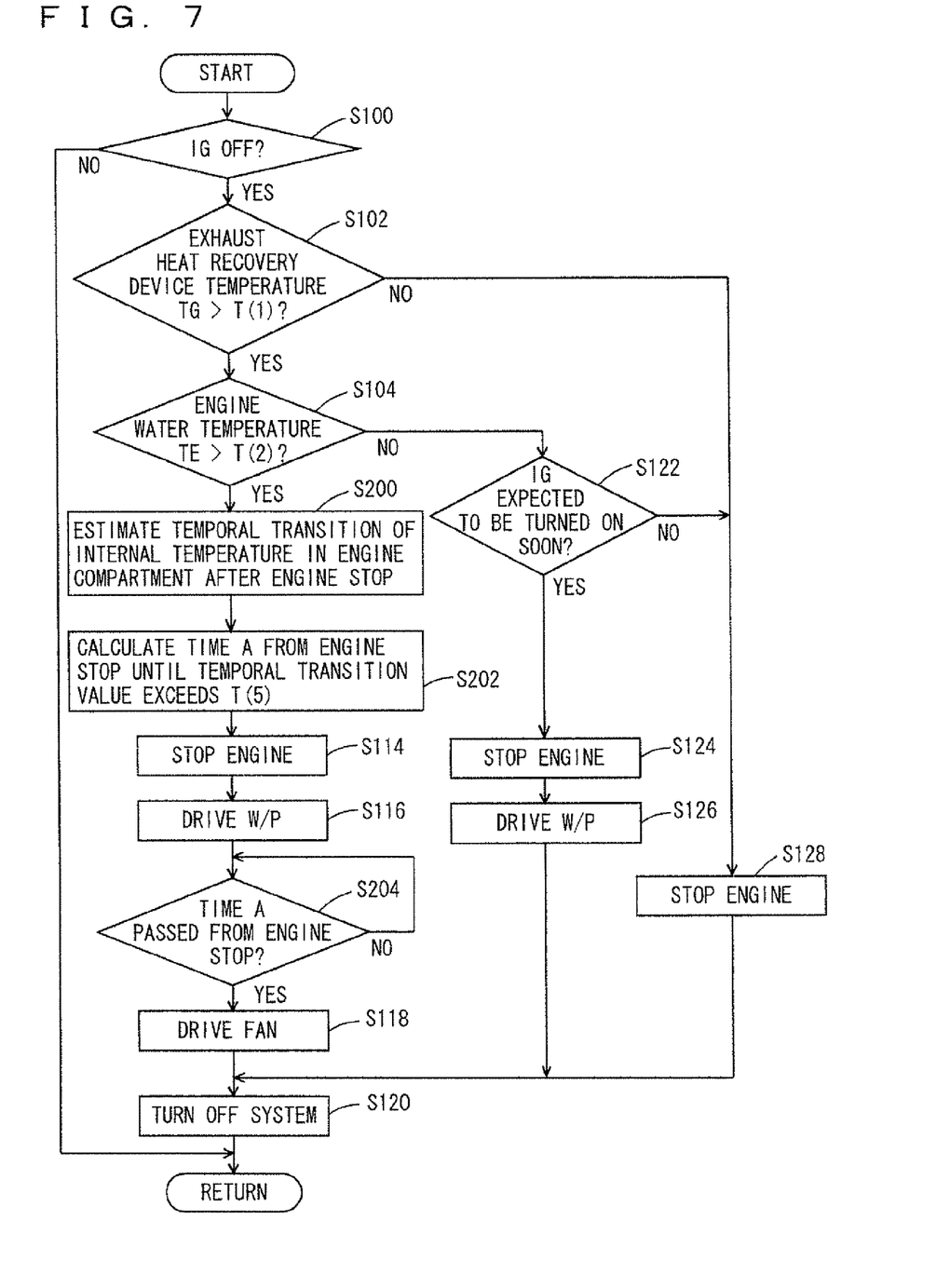
[FIG. 7] A flowchart representing a control structure of an ECU forming the cooling controller in accordance with a modification (Version 3) of the first embodiment of the present invention.

Referring to FIG. 7, the control structure of the program executed by ECU 400 as the cooling controller in accordance with the present modification will be described. In the flowchart shown in FIG. 7, the same processes as those of the flowchart shown in FIG. 3 are denoted by the same step numbers. The process contents are also the same. Therefore, detailed description thereof will not be repeated.

At S200, ECU 400 estimates temporal transition value of internal temperature of engine compartment 14 after the engine stops. By way of example, ECU 400 estimates the temporal transition value of internal temperature using engine water temperature TE, engine load accumulated value, vehicle speed history and the like as parameters.

At S202, ECU 400 calculates time A from when the engine is stopped until the internal temperature exceeds a predetermined temperature T(5), based on the temporal transition value of internal temperature. The predetermined temperature T(5) is a value set based on the heatproof temperature of components for driving electric water pump 150 and the cooling performance of electric fan 140. The predetermined value T(5) is set to such a value that is lower than the heatproof temperature of components for driving electric water pump 150 and that even when driving of electric fan 140 is started from the time point when the internal temperature reaches T(5), the internal temperature of engine compartment 14 will not exceed the heatproof temperature of components for driving electric water pump 150.

At S204, ECU 400 determines whether or not time A has passed from when the engine was stopped. If time A has passed (YES at S204), the process proceeds to S118. Otherwise (NO at S204), the process waits until time A passes.

By this approach, the temporal transition value of internal temperature of engine compartment after the engine stops is estimated, and electric fan 140 is driven from the timing when the temporal transition value of internal temperature exceeds T(5) (that is, the timing when time A has passed from engine stop). Specifically, electric fan 140 is not driven from the time when engine is stopped, but rather, electric fan 140 can be driven from the time point when components for driving electric water pump 150 is about to be overheated to exceed the heatproof temperature. Therefore, power consumption can be reduced than when electric fan 140 is driven after the engine is stopped.

The timing to start driving of electric fan 140 may be set to a timing in accordance with the timing when time A passes from the engine stop. For example, driving of electric fan 140 may be started at a timing slightly earlier than the timing when time A passes.

Second Embodiment

Figure 8:
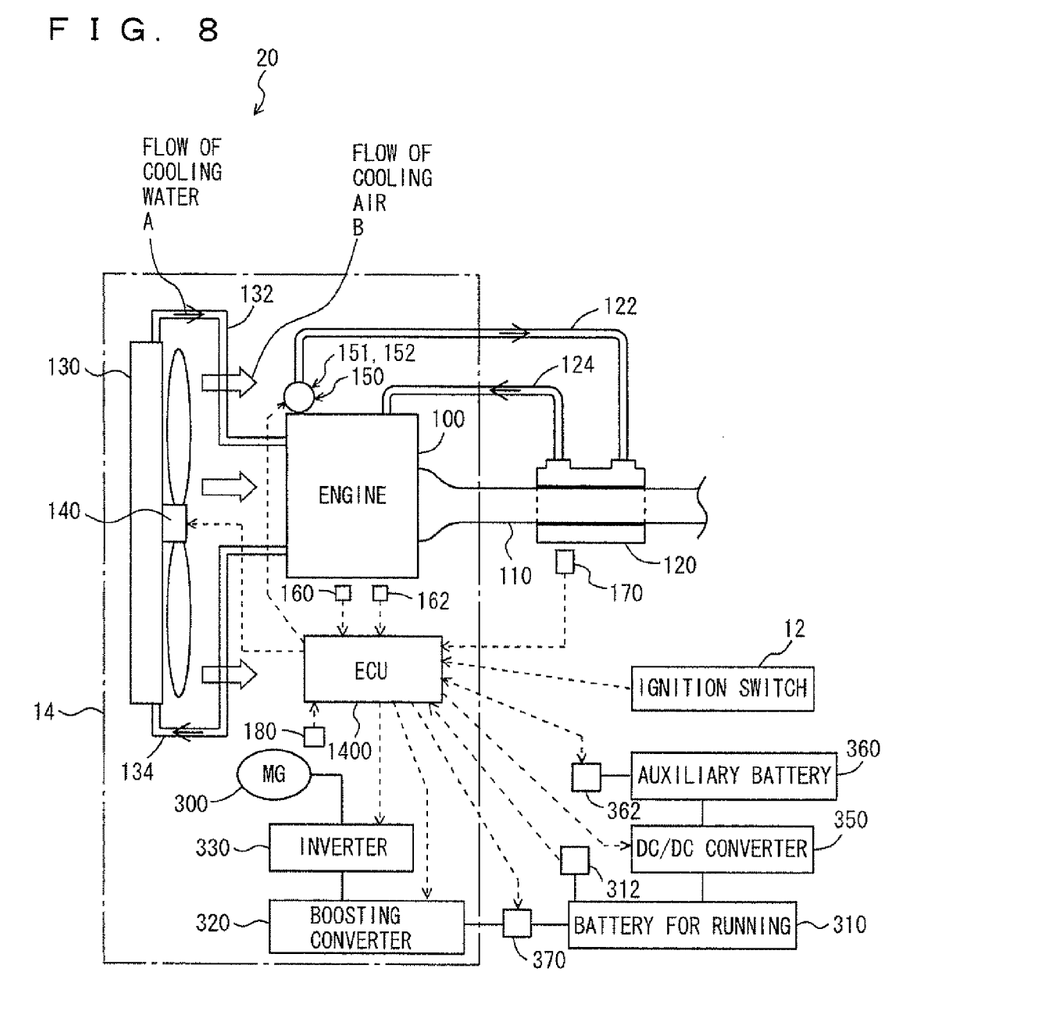
[FIG. 8] A diagram showing a configuration of a vehicle on which the cooling controller in accordance with a second embodiment of the present invention is installed.

In the following, a cooling controller in accordance with the present embodiment will be described. A hybrid vehicle 20 provided with the cooling controller in accordance with the present embodiment has a structure different from the structure of hybrid vehicle 10 described in the first embodiment above, in that it further includes a temperature sensor 180 and includes an ECU 1400 in place of ECU 400, as shown in FIG. 8. ECU 1400 is different from ECU 400 in that temperature sensor 180 is further connected and that the program executed therein has a different control structure. Except for these points, the structure is the same as that of hybrid vehicle 10 in accordance with the first embodiment described above. The same components are denoted by the same reference characters. Their functions are also the same. Therefore, detailed description thereof will not be repeated here.

Temperature sensor 180 detects internal temperature TC of engine compartment 14, and transmits a signal indicating the result of detection to ECU 1400.

Figure 9:
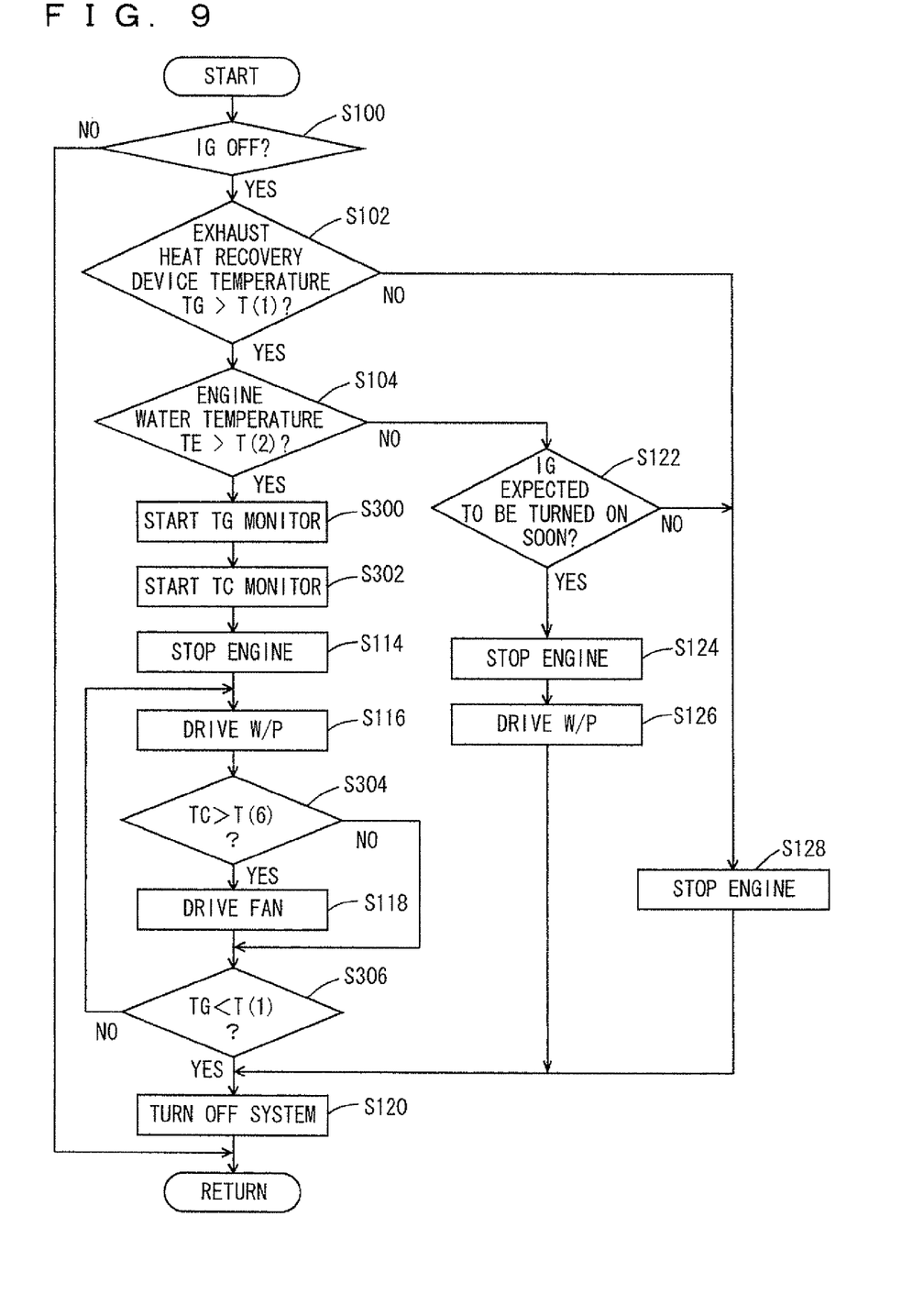
[FIG. 9] A flowchart representing a control structure of an ECU forming the cooling controller in accordance with the second embodiment of the present invention.

Referring to FIG. 9, the control structure of the program executed by ECU 1400 as the cooling controller in accordance with the present embodiment will be described. In the flowchart shown in FIG. 9, the same processes as those of the flowchart shown in FIG. 3 are denoted by the same step numbers. The process contents are also the same. Therefore, detailed description thereof will not be repeated.

At S300, ECU 1400 starts monitoring of exhaust heat recovery device temperature TG, based on a signal from temperature sensor 170. At S302, ECU 1400 starts monitoring of internal temperature TC of engine compartment 14, based on a signal from temperature sensor 180.

At S304, ECU 1400 determines whether or not internal temperature TC has exceeded a predetermined temperature T(6). The predetermined temperature T(6) is a value set based on the heatproof temperature of components for driving electric water pump 150 and cooling performance of electric fan 140. The predetermined value T(6) is set to such a value that is lower than the heatproof temperature of components for driving electric water pump 150 and that even when driving of electric fan 140 is started from the time point when the internal temperature reaches T(6), the internal temperature of engine compartment 14 will not exceed the heatproof temperature of components for driving electric water pump 150. If it exceeds the predetermined temperature T(6) (YES at S304), the process proceeds to S118. Otherwise (NO at S304), the process proceeds to S306.

At S306, ECU 1400 determines whether or not the exhaust heat recovery device temperature TG has become lower than the predetermined temperature T(1). If it becomes lower than the predetermined temperature T(1) (YES at S306), the process proceeds to S120. Otherwise (NO at S306), the process returns to S116.

As described above, according to the cooling controller of the present embodiment, internal temperature TC of engine compartment 14 detected by temperature sensor 180 is continuously monitored even after the engine is stopped, and when internal temperature TC exceeds T(6) (YES at S304), electric fan 140 is driven. Therefore, driving of electric fan 140 can be minimized, and wasteful power consumption can be reduced.

The embodiments as have been described here are mere examples and should not be interpreted as restrictive. The scope of the present invention is determined by each of the claims with appropriate consideration of the written description of the embodiments and embraces modifications within the meaning of and equivalent to, the languages in the claims.

The invention claimed is:

1. A cooling controller for a vehicle including an engine in an engine compartment, comprising:
    an electric water pump causing flow of a coolant for said engine;
    a drive component for driving said electric water pump, mounted in said engine compartment;
    an electric fan for cooling said drive component; and
    a control unit that is configured to control said electric water pump and said electric fan; wherein
    said control unit is further configured to (1) drive said electric water pump after said engine is stopped, (2) estimate a temporal transition value of an internal temperature of said engine compartment after said engine is stopped, (3) determine whether or not said temporal transition value exceeds a threshold value that is calculated using a heatproof temperature of said drive component, and (4) drive said fan when said electric water pump is driven after said engine is stopped and it is determined that said temporal transition value exceeds said threshold value, from a timing in accordance with a timing when said temporal transition value exceeds said threshold value.

2. The cooling controller according to claim 1, wherein said control unit is further configured to estimate said temporal transition value, based on temperature of said coolant before said engine is stopped and on load history on said engine before said engine is stopped.

3. A cooling controller for a vehicle including an engine in an engine compartment, comprising:
    an electric water pump causing flow of a coolant for said engine;
    a drive component for driving said electric water pump, mounted in said engine compartment;

an electric fan for cooling said drive component; and
a control unit that is configured to control said electric water pump and said electric fan; wherein
said vehicle further includes a heat exchanger transmitting exhaust heat of said engine to said coolant, and a power storage device storing power for driving said electric water pump and said electric fan;
said control unit is further configured to (1) drive said electric water pump based on at least one of temperature of said coolant, temperature of said heat exchanger and state of charge of said power storage device, after said engine is stopped, (2) determine whether or not a value related to an internal temperature of said engine compartment after said engine is stopped exceeds a threshold value that is calculated using a heatproof temperature of said drive component, (3) drive said fan when said electric water pump is driven after said engine is stopped and it is determined that the value related to said internal temperature exceeds said threshold value, and (4) drive said electric water pump when the temperature of said heat exchanger is higher than a predetermined temperature, the temperature of said coolant is lower than a predetermined temperature and time period from when said engine is stopped until it is restarted is expected to be short.

4. The cooling controller according to claim 1, wherein
said vehicle further includes a first power storage device storing power for driving said electric water pump and said electric fan, a second power storage device different from said first power storage device, and a voltage converter provided between said first power storage device and said second power storage device; and
said control unit is further configured to control said voltage converter such that said first power storage device is charged with the power from said second power storage device, when said electric water pump is driven after said engine is stopped and a prescribed condition is satisfied.

5. The cooling controller according to claim 4, wherein
said prescribed condition is that a value indicating state of charge of said first power storage device is smaller than a prescribed value.

6. The cooling controller according to claim 3, wherein
said vehicle further includes a first power storage device storing power for driving said electric water pump and said electric fan, a second power storage device different from said first power storage device, and a voltage converter provided between said first power storage device and said second power storage device; and
said control unit is further configured to control said voltage converter such that said first power storage device is charged with the power from said second power storage device, when said electric water pump is driven after said engine is stopped and a prescribed condition is satisfied.

7. A cooling control method performed by a control unit controlling a vehicle including an electric water pump causing flow of a coolant for an engine, a drive component for driving said electric water pump, mounted in an engine compartment, and an electric fan for cooling said drive component, comprising the steps of:
driving said electric water pump after said engine is stopped;
estimating a temporal transition value of an internal temperature of said engine compartment after said engine is stopped;
determining whether or not said temporal transition value exceeds a threshold value that is calculated using a heatproof temperature of said drive component; and
driving said electric fan, when said electric water pump is driven after said engine is stopped and it is determined that said temporal transition value will exceed said threshold value, from a timing in accordance with a timing when said temporal transition value exceeds said threshold value.

8. The cooling control method according to claim 7, wherein
at said estimating step, said temporal transition value is estimated based on temperature of said coolant before said engine is stopped, and on load history of said engine before said engine is stopped.

9. The cooling control method according to claim 7, wherein
said vehicle further includes a first power storage device storing power for driving said electric water pump and said electric fan, a second power storage device different from said first power storage device, and a voltage converter provided between said first power storage device and said second power storage device;
said cooling control method further comprising the step of controlling said voltage converter such that said first power storage device is charged with the power from said second power storage device, when said electric water pump is driven after said engine is stopped and a prescribed condition is satisfied.

10. The cooling control method according to claim 9, wherein
said prescribed condition is that a value indicating state of charge of said first power storage device is smaller than a prescribed value.

11. A cooling control method performed by a control unit controlling a vehicle including an electric water pump causing flow of a coolant for an engine, a drive component for driving said electric water pump, mounted in an engine compartment, and an electric fan for cooling said drive component, comprising the steps of:
driving said electric water pump after said engine is stopped;
determining whether or not a value related to internal temperature of said engine compartment after said engine is stopped exceeds a threshold value that is calculated using a heatproof temperature of said drive component; and
driving said electric fan, when said electric water pump is driven after said engine is stopped and it is determined that said value related to said internal temperature exceeds said threshold value; wherein
said vehicle further includes a heat exchanger transmitting exhaust heat of said engine to said coolant, and a power storage device storing power for driving said electric water pump and said electric fan; and
at said step of driving said electric water pump, said electric water pump is driven based on at least one of temperature of said coolant, temperature of said heat exchanger and state of charge of said power storage device; and
at said step of driving said electric water pump, said electric water pump is driven when the temperature of said heat exchanger is higher than a predetermined temperature, the temperature of said coolant is lower than a predetermined temperature and time period from when said engine is stopped until it is restarted is expected to be short.

12. The cooling control method according to claim 11, wherein
said vehicle further includes a first power storage device storing power for driving said electric water pump and said electric fan, a second power storage device different from said first power storage device, and a voltage converter provided between said first power storage device and said second power storage device;
said cooling control method further comprising the step of controlling said voltage converter such that said first power storage device is charged with the power from said second power storage device, when said electric water pump is driven after said engine is stopped and a prescribed condition is satisfied.

* * * * *